United States Patent [19]

Totten et al.

[11] Patent Number: 4,579,964

[45] Date of Patent: Apr. 1, 1986

[54] ALKOXYSILYL FUNCTIONAL SILICONES

[75] Inventors: George E. Totten, West Haverstraw; Arthur N. Pines, Katonah, both of N.Y.

[73] Assignee: Union Carbide Corporation, Danbury, Conn.

[21] Appl. No.: 480,701

[22] Filed: Mar. 31, 1983

[51] Int. Cl.$^4$ .......................... C07F 7/08; C07F 7/18
[52] U.S. Cl. ...................... 556/434; 252/86; 8/115.6
[58] Field of Search ......................................... 556/434

[56] References Cited

U.S. PATENT DOCUMENTS

| | | | |
|---|---|---|---|
| 3,109,013 | 10/1963 | Haluska | 556/434 X |
| 3,175,993 | 3/1965 | Weyenberg | 556/434 X |
| 3,383,162 | 5/1968 | Whitfield et al. | 8/115.5 |
| 3,418,160 | 12/1968 | Abashian | 117/138.8 |
| 3,455,878 | 7/1969 | Quaal | 556/434 X |
| 3,457,213 | 7/1969 | Manos | 260/33.4 |
| 3,488,217 | 1/1970 | Ryan et al. | 117/138.8 |
| 3,511,699 | 5/1970 | Johnson et al. | 117/135.5 |
| 3,544,362 | 12/1970 | Deiner et al. | 117/139.5 |
| 3,565,845 | 2/1971 | Johnson | 260/29.2 |
| 3,567,499 | 3/1971 | Klebert | 117/139.5 |
| 3,819,674 | 6/1974 | Rudolph et al. | 556/434 |
| 3,962,500 | 6/1976 | Smith | 260/825 |
| 3,992,332 | 11/1976 | Zenon | 252/548 |
| 4,184,004 | 1/1980 | Pines et al. | 428/413 |
| 4,208,503 | 6/1980 | Martin | 528/14 |
| 4,283,519 | 8/1981 | Pines et al. | 528/26 |

FOREIGN PATENT DOCUMENTS

| | | | |
|---|---|---|---|
| 1816279 | 7/1970 | Fed. Rep. of Germany | 556/434 UX |
| 2128786 | 12/1972 | Fed. Rep. of Germany | 556/434 UX |
| 2922376 | 12/1980 | Fed. Rep. of Germany | 556/434 UX |
| 74-27695 | 7/1974 | Japan | 556/434 UX |
| 953058 | 8/1974 | Japan | 556/434 UX |
| 75-44992 | 4/1975 | Japan | 556/434 UX |
| 76-119752 | 4/1975 | Japan | 556/434 UX |
| 76-01790 | 1/1976 | Japan | 556/434 UX |
| 76-23398 | 2/1976 | Japan | 556/434 UX |
| 77-55787 | 5/1977 | Japan | 556/434 UX |
| 77-142773 | 11/1977 | Japan | 556/434 UX |
| 79-156899 | 12/1979 | Japan | 556/434 UX |
| 80-36258 | 3/1980 | Japan | 556/434 UX |
| 81-134271 | 10/1981 | Japan | 556/434 UX |
| 1296136 | 11/1972 | United Kingdom | 556/434 UX |
| 1308210 | 2/1973 | United Kingdom | 556/434 UX |
| 1389862 | 4/1975 | United Kingdom | 556/434 UX |
| 1549180 | 7/1979 | United Kingdom | 556/434 UX |
| 1585791 | 3/1981 | United Kingdom | 556/434 UX |

Primary Examiner—Paul F. Shaver
Attorney, Agent, or Firm—Paul W. Leuzzi, II

[57] ABSTRACT

Novel alkoxysilyl functional silicones capable of imparting satisfactory lubricity and other properties such as softness to a variety of textile fabrics over an extended period of time under normal usage. The alkoxysilyl functional silicones include at least one functional group of the formula:

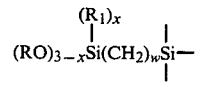

wherein R is an alkyl or an acyl hydrocarbon radical having from one to four carbon atoms; $R_1$ is an alkyl radical of from one to two carbon atoms or a mixture thereof; and w is an interger of from 2 to about 20.

9 Claims, No Drawings

ALKOXYSILYL FUNCTIONAL SILICONES

BACKGROUND OF THE INVENTION

1. Field of the Invention

This invention relates to alkoxysilylalkyl functional silicones, to their utilization as finishing agents for natural and synthetic textiles, and to textile materials embodying such functional silicones.

2. Description of the Prior Art

The application of finishing agents to textiles has been practiced for many years. Thus, as one example, it is conventional practice to apply various finishing agents to the staple fibers used in what is sometimes termed "fiberfill" applications to enhance such properties as resiliency and softness. Applications such as pillows, sleeping bags, and jackets often utilize staple textiles of either a synthetic or natural nature, polyester and nylon fibers being often used. Such fibers require a finishing agent to be applied to allow the fiberfill to function as is desired.

To this end, many types of organosilicon compounds have been utilized as finishing agents which impart lubricity, thereby producing the desired product characteristics. As one example, polydimethyly siloxanes and silanol end-blocked polydimethyl siloxanes have been utilized for this purpose.

Likewise, textile fibers treated with a durable press resin typically require treatment with a softening agent to achieve commercially acceptable hand, strength, and wrinkle recovery. A variety of silicone compounds have been proposed and employed as softening agents.

Still further, what has been sometimes termed a thread lubricant has been applied to continuous filaments to facilitate the winding up and other processing of such filaments. There are many other similar applications.

While many organosilicon compounds initially impart acceptable lubricity and other characteristics to textiles, it has been recognized that improvements are needed to provide acceptable characteristics over extended use. Stated another way, commonly used organosilicon compounds do not impart adequate durability, viz.—the desirable properties are often readily lost in use. For example, when textiles coated with such materials are exposed to water, especially under non-neutral conditions, e.g., when the textile is washed with an alkaline detergent solution, the organosilicon compounds are removed. In other words, the coatings are removed when the textiles are subjected to repeated washings.

The recognition of this drawback has spawned a variety of techniques designed to improve the permanence or durability of the desired properties. Perhaps the principal effort has been directed towards achieving a chemical bond between the finishing agent and the textile, as by cross-linking the finishing agent to the textile.

Other attempts to solve this problem have involved cross-linking the finishing agent itself. Thus, in concept, the objective is to encapsulate the textile fiber in the finishing agent which is itself then cross-linked in some fashion. Some attempts have utilized modification of the organosilicon compound utilized so that the compound may be cross-linked with an additional agent. U.S. Pat. No. 3,383,162 suggests the utilization of a pendant aminobutyl functional dimethylsiloxane which is cross-linked with toluene diisocyanate. French Patent 1,549,327 utilizes an aqueous emulsion of a poly (methylhydrosiloxane) and a commercial epoxy resin. Upon cross-linking at room temperature, a curable softness is said to be provided to a fabric substrate.

Still further, U.S. Pat. No. 3,565,845 discloses the use of particular siloxane-polyoxyalkylene block copolymers containing methoxysiloxy groups. Such copolymers are disclosed as providing durable coatings on fibrous materials.

Also, U.S. Pat. No. 4,283,519 discloses organosilicone terpolymers containing pendant polyoxyalkylene groups and a number of hydrolyzable silyl groups. Such terpolymers are utilized as a hydrophilic finishing agent for natural and synthetic fabric.

Despite the considerable efforts in this area and the diversity of approaches which have been suggested, there remains the need for a finishing agent which is capable of imparting the satisfactory lubricity and other characteristics to textile fibers while providing durability. The prior efforts thus show the need for a finishing agent which provides the requisite durability in an economical and facile fashion.

SUMMARY OF THE INVENTION

This invention provides novel alkoxysilylalkyl functional silicones which are capable of imparting superior lubricity and other properties such as softness to a variety of textile fabrics over an extended period of time under normal usage. Such functional silicones may be readily applied to the textile fabrics and should impart ample durability.

It is believed that the durability is achieved due to the facile cross-linking of such compounds which is carried out in processing. Despite the ability to readily cross-link, the functional silicones of the present invention suprisingly exhibit both satisfactory stability upon preparation as well as upon relatively long term storage.

While the invention will be described in connection with the referred embodiments; it will be understood that we do not intend to limit the invention to those embodiments. On the contrary, we intend to cover all alternatives, modifications and equivalents as may be included within the spirit and scope of the invention as defined by the appended claims. As an example, while the present invention will be described herein in relation to alkoxysilylalkyl functional silicones and their use as finishing agents for natural and synthetic textiles, it should be appreciated that the functional silicones of the present invention are likewise useful in other applications where lubricity and durability of the finishing compound is required, such as thread and glass lubricants.

DETAILED DESCRIPTION OF THE INVENTION

The alkoxysilylalkyl functional silicones of this invention are described by the following empirical formulas I and II:

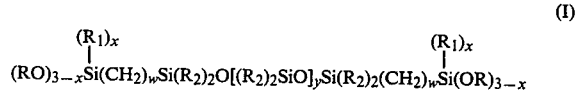

(I)

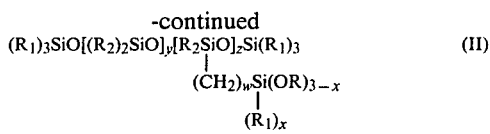

$$(R_1)_3SiO[(R_2)_2SiO]_y[R_2SiO]_zSi(R_1)_3 \quad (II)$$
$$|$$
$$(CH_2)_wSi(OR)_{3-x}$$
$$|$$
$$(R_1)_x$$

wherein R is an alkyl radical or an acyl hydrocarbon radical having from one to four carbon atoms; $R_1$ is an alkyl radical of one or two carbon atoms; $R_2$ is an alkyl radical having from one to three carbon atoms or an aryl radical such as phenyl, benzyl or phenylethyl; w is an integer of at least 2 and may range up to 18 or 20 or so; x is either 0, 1 or 2; y is an integer of an average of at least 6 and may range up to about 1000 or even higher; and z is an integer of an average of at least 1 and may range up to about 100 or higher.

Considering the functional silicones of the present invention more specifically, the primary function is that the specific compound utilized be capable of undergoing a facile hydrolysis and condensation reaction to provide the desired cross-linking for the particular application involved. With this in mind, the R radical should be one that is easily removed by hydrolysis. It is accordingly preferred to utilize a methyl radical.

Similarly, to enhance cross-linking, it is preferred that the silyl moiety is at least difunctional owing to the greater propensity of silane diols and especially silane triols to condense. Accordingly, it is preferred that x be either 0 or 1, most preferably 0.

The function of the methylene, $(CH_2)_w$, moiety is believed to, in effect, serve as a spacer separating the functional silyl groups from the siloxane backbone chain of the compound thereby minimizing possible steric hindrance effects. It has been found satisfactory, and is accordingly preferred, to utilize a compound wherein w is 2 or 3, although the value of w may be perhaps increased depending upon the steric considerations involved.

The radicals utilized for $R_1$ and $R_2$ will generally depend upon the ease of synthesis. For this reason, it is preferred that $R_1$ and $R_2$ be methyl radicals. However, ethyl radicals and mixtures of methyl and ethyl radicals may be used for $R_1$, while alkyl radicals of from 1 to 3 carbon atoms, and aryl radicals such as phenyl, benzyl and phenylethyl, as well as mixtures of alkyl radicals, aryl radicals and alkyl and aryl radicals may be used for $R_2$.

As to the size of the siloxane backbone chain, this is principally determined by the values for y, and y and z, in formulas I and II, respectively. The particular value employed may be selected on the basis of the ease of synthesis. With regard to empirical formulas I and II, and from the functional standpoint, the value for y should be an average of at least about 6. The upper limit is not believed to be particularly critical from the standpoint of the utility of the compound. Compounds having y values up to 1000 or even more should be capable of being utilized. Similarly, with respect to empirical formula II, the z value, from the functional standpoint, should be an average of at least 1 in order to obtain the desired lubricity and other properties of the compounds of this invention. However, preferably, the value for z will be an average of at least 2 or more. Again, as was the case with empirical formula I, the upper limit is not believed to be particularly critical from the functional standpoint. The value of z should accordingly be capable of being an average as large as 100 or even more.

The alkoxysilylalkyl compounds of the present invention may be prepared, for example, by a two step synthesis, as is known. In the first step, the silanic hydrogen functional silicone precursors are prepared by reacting a compound having a free silanic hydrogen with a cyclic $[(R_2)_2SiO]_4$, or linear $HO[(R_2)_2SiO]_nH$, compound which provides the siloxane backbone chain in both the precursor and final compound. In the case of compounds of formula II, There will be also included as a reactant, a hexaalkyl disiloxane, for example. The stoichiometry of the reactants is selected to provide the desired values of y, in the case of compounds of formula I, and y and z in the case of compounds of formula II.

The silanic hydrogen functional silicone precursor utilized to form the compound of formula I may be prepared by the following general reaction (III):

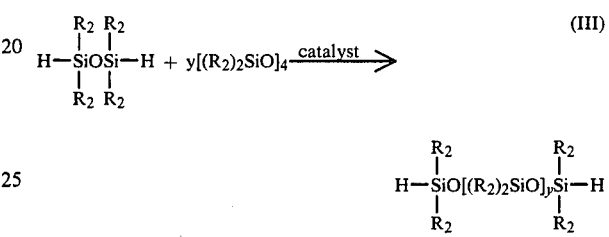

and the precursor utilized to form the compound of formula II may be prepared by the following general reaction (IV):

$$(R_1)_3SiOSi(R_1)_3 + y[(R_2)_2SiO]_4 + \quad (IV)$$

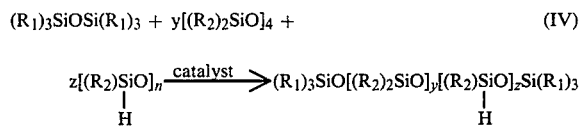

It will be appeciated that $R_1$, $R_2$, y and z in reactions III and IV have the same meaning as $R_1$, $R_2$, y and z in formulas I and II.

As is known, the catalyst used in the reactions set forth above is a Lewis acid catalyst. A wide variety of Lewis acids may be suitably employed, including mineral acids such as sulfuric acid, and organic acids such as trifluoromethane sulfonic acid, sulfonic acid functional polystyrene, and the like. Preferably, trifluoromethane sulfonic acid is used. The amount of catalyst employed, as is also known, may vary widely, e.g.—from about 100 parts per million up to about five percent by weight or so. While a mixture of acids may be used, there will generally be no particular advantage.

The precursor-forming reactions may be carried out over a wide temperature range, for example from as low as about $-50°$ C. to as high as about $100°$ C. The reaction temperature will generally depend upon the catalyst selected, as is known.

The reaction may be carried out at atmospheric pressure since the reactants and products are not sufficiently volatile at such pressure to cause any problems with handling or the like. However, the reaction may be conducted under pressure if desired without any adverse effects.

The second step of the synthesis involves carrying out a known hydrosilylation reaction. The compounds of formula I may be prepared by the general reaction identified as V:

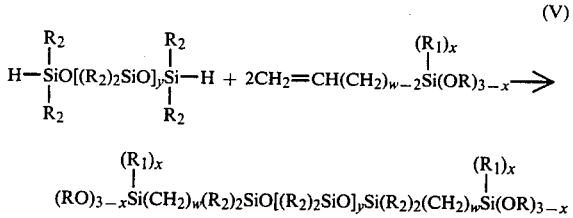

(V)

The compounds of formula II may be prepared according to general rection VI:

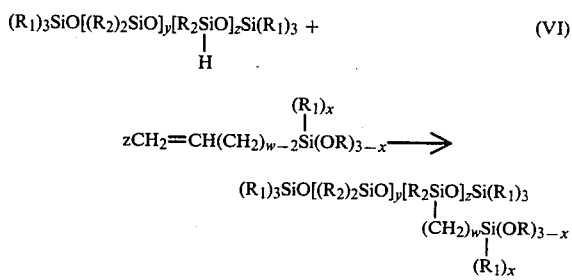

In reactions V and VI, R, $R_1$, $R_2$, w, x, y and z have the same meaning as they have in formulas I and II.

As has been seen, the functional silicones of this invention may thus be prepared by the reaction of the appropriate alkenyl functional silane with the desired silanic hydrogen functional silicone. Appropriate reaction conditions are known and may be selected to provide the ease of synthesis desired. Moreover, the synthesis of the alkenyl functional silane reactant is known.

As is known, the hydrosilylation reaction may be desirably carried out by utilizing various catalysts. Hexachloroplatinic acid may suitably be used, as is known. In addition, platinum on carbon and benzoyl peroxide are likewise known catalysts for this type of reaction. Mixtures of such catalysts may be employed, although only a single material is typically used since no advantage is achieved with a mixture. Suitable amounts for the catalyst are known.

With regard to the other reaction parameters, the synthesis may be carried out, as is known, at elevated temperatures, e.g.—desirably from about 80° to 110° C. A temperature in the range of from about 25° C. to about 175° C. could likewise be employed. While the hydrosilylation reactions V and VI may be carried out under pressure, it is preferred to carry out the reaction at atmospheric pressure since the reagents and products are not volatile under the reaction conditions typically employed. Still further, as regards the stoichiometry, a light excess of the alkenyl functional silane will typically be used to insure completeness of the reaction. Of course, the stoichiometry may be varied as desired. Also, if it is desired to remove any excess unreacted alkenyl functional silane from the reaction product, this may be accomplished as for example, by vacuum stripping.

Desite the ability of the compounds of the present invention to readily cross-link under relatively mild application conditions, the functional silicones of the present invention are surprisingly stable. Thus, there is typically no observable gel formation upon preparation, and the compounds may be stored for extended periods of time without any adverse gel formation. Indeed, and surprisingly, compounds may accordingly be stored for up to 3 months or so even as an aqueous emulsion. Indefinite storage should be capable of being achieved with the compounds in an as prepared condition. Storage in an alcohol carrier may likewise be utilized, if desired.

The textile materials which may be treated with the functional silicones of the present invention can be any natural or synthetic material. For example, cotton, polyester, wool, nylon, polypropylene, acrylic, rayon, silk or blends of these materials are often employed in applications where silicone finishes have been found to be commercially desirable or necessary, In the fiberfill application, polyesters, nylons, and blends of polyester and cotton have often been utilized. Likewise, depending upon the particular application, the textile fiber may be in staple or filament form. The Textile material may be in a variety of forms, e.g.—woven, non-woven, knits, mats, cloth, and the like.

It has been found that exemplary durability is provided, regardless of whether or not the textile involved is capable of reaction with the functional silicones of the present invention. Where a cellulosic material is employed, it may well be that chemical bonding occurs between the textile substrate and the functional silicones of the present invention as well. Such chemical bonding may perhaps enhance the durability, but it is certainly not essential to provide the superior durability achieved through use of the functional silicones of this invention.

The textile materials may be treated with the functional silicones of the present invention in any of a variety of ways. As one example, the alkoxysilylalkyl functional silicones may be applied to the textile materials from either a homogeneous alcohol/water solution or from an aqueous emulsion. It is preferred to utilize an aqueous emulsion, and this is compatible with conventionally used textile treating methods.

The textile material may thus be immersed in a solution containing the functional silicones of this invention, with the excess solution then being removed from the textile material, as, for example, by padding or the like. The particular concentration of the functional silicone in the solution or emulsion may be arid as desired, depending upon the particular application.

When employed as a fiberfill lubricant, it has been found suitable to maintain the concentration of the functional silicone in the range from about 0.1 to 5.0% by weight of the solution or emulsion, preferably a concentration of between about 0.25 and 1.0% by weight being utilized. Employing such concentrations will result in a satisfactory amount of the functional silicones being taken up by the textile material.

As is known, the amount desired can likewise be determined by the amount included in the resulting product. With this technique, the amount of the functional silicones may vary, based upon the weight of the textile material, from perhaps about 0.1 to about one percent. From the functional standpoint, the textile should take up a sufficient amount of the functional silicone to satisfy the properties desired for the particular application. Excess mounts over that may be used but will generally not provide any advantage.

After application, the treated textile material is cured to carry out the necessary cross-linking. This may be achieved in a variety of ways. It has thus been found that the functional silicones of the present invention may be cured under what are considered to be relatively mild conditions. In addition to a catalyst, water must be present in order to hydrolyze the functional silicone to the silanol which then cross-links as described. The functional silicone containing solution is cured at an elevated temperature, which is not critical, but which must be sufficiently high so that the silanol cross-links to form the finish on the textile. The particular curing temperature utilized will generally depend upon the specific textile material involved.

As one example, when utilizing an alcohol/water solution of the functional silicone, it is suitable to utilize water in an amount of about 10% by weight of the solution with 0.1% by weight of acetic acid to serve as the catalyst. Other acid catalysts, such as hydrochloric acid, p-toluene sulfonic acid, octanoic acid, and trifluoroacetic acid may likewise be used. Indeed, any organic or mineral acid may be suitably employed, or even in some situations a basic catalyst. Exemplary curing temperatures may range from about 50° to about 250° C.

It has been found, surprisingly, that not only do the functional silicones of this invention impart the desired durability to textiles but significantly superior lubricity is also achieved. As an example, the state of the art techniques generally will achieve values of about 0.25 or somewhat lower, base upon the Staple Pad Friction Index commonly utilized to measure lubricity for fiberfill applications. The utilization of the functional silicones of the present invention are capable of achieving values under some conditions of 0.2 or lower. Performance of this level is considered to be a substantial improvement in relation to such state of the art techniques. Both the terminal (Formula I) and pendant (Formula II) trialkoxysilylalkyl functional silicones of the present invention thus impart substantial lubricity properties to textile fiberfill. Concentrations of the trimethoxysilylethyl functional silicone species of this invention as low as about 0.25% by weight in the treating solution have been found to provide excellent fiberfill lubricity. It is believed that this superior lubricity will likewise be attained in other textile applications as well.

As regards the fabric softening application, as is known, a variety of durable press resins are applied to the cotton, cotton/polyester blend or the like to impart the desired properties to the fabric. Suitable durable pess resins are known in the art and include aminoplast resins, epoxides, aldehyde, aldehyde derivatives, sulfones, and sulfoxides. Aminoplasts are often preferred durable pess resins, as they are relatively inexpensive. Suitable durable press agents are disclosed in "Crease proofing Resins For Wash-And-Wear Finishing" by A. C. Nuessle, Textile Industries, October, 1959, Pages 1-12. A specific example of an aldehyde crease proofing agent commonly utilized in a glyoxal-based resin.

The application of such a durable press resin, as is known, imparts a harsh and somewhat stiff feel to the fabric which causes it to be easily wrinkled. The application of a softening agent, at least in significant part, overcomes these negative properties.

It has been found that treatment of the fabrics with the functional silicones of this invention provides excellent softness. However, to achieve the desired durable effect, based upon data developed to date, it is preferred to utilize functional silicones with relatively long siloxane backbone chains. It has thus been found that the functional silicones of the present invention when used for this application should desirably have, in formulas I and II, y and z values of at least 100.

The following Examples are intended to further illustrate the invention which is described herein and are not intended to unduly limit the scope of the invention.

Unless otherwise indicated all parts and percentages are by weight in the following Examples.

DEFINITIONS

As used in the Examples appearing below, the following designations, symbols, terms and abbreviations have the indicated meanings:

---

SPF denotes staple pad friction index
CELITE 545 denotes diatomaceous earth
Hollofill 808 polyester fiberfill denotes a
polyester fiberfill commercially available
from E. I. duPont deNemours and Company
AATCC #124 denotes an alkaline detergent
manufactured by American Association of
Textile Chemists and Colorists Association M denotes
$(CH_3)_3SiO_{(0.5)}$ M' (or 'M) denotes
$HSi(CH_3)_2O_{(0.5)}$ M'' (or ''M) denotes
$(CH_3O)_3Si(CH_2)_2\underset{\underset{CH_3}{|}}{\overset{\overset{CH_3}{|}}{Si}}O_{(0.5)}$ M''' (or '''M) denotes
$(C_2H_5O)_3Si(CH_2)_2\underset{\underset{CH_3}{|}}{\overset{\overset{CH_3}{|}}{Si}}O_{(0.5)}$ D denotes
$\underset{\underset{CH_3}{|}}{\overset{\overset{CH_3}{|}}{-SiO}}$ D' denotes 

D'' denotes
$\underset{}{\overset{\overset{CH_3}{|}}{OSi(CH_2)_2Si(OCH_3)_3}}$

D''' denotes
$\underset{}{\overset{\overset{CH_3}{|}}{OSi(CH_2)_2Si(OC_2H_5)_3}}$ D'''' denotes
$\underset{\underset{CH_3}{|}}{\overset{\overset{CH_3}{|}}{OSi(CH_2)_2Si(OCH_2CH_3)_3}}$ ViSi(OMe)₃ denotes
$CH_2=CHSi(OCH_3)_3$ ViSi(OEt) denotes
$CH_2=CHSi(OCH_2CH_3)_3$ ViSiMe₂OEt denotes
$CH_2=CH\underset{\underset{CH_3}{|}}{\overset{\overset{CH_3}{|}}{Si}}OCH_2CH_3$ The results of certain tests conducted with the compounds of the present invention used as finishing agents are also described. These tests were made substantially in accordance with the following procedures:

The type of precursor prepared, the amount of the reactants used (in grams), and the viscosity and refractive index of the precursors formed are set forth in Table I.

TABLE I

| Ex. No. | Precursor | REAGENTS USED | | | | | PRECURSOR PROPERTIES | |
|---|---|---|---|---|---|---|---|---|
| | | M'M' | MD'$_{40}$M | MD$_3$M | D$_4$ | CF$_3$SO$_3$H | Viscosity cps at 25° C. | $n_D^{25}$ |
| 1 | M'D$_3$M' | 361.1 | — | — | 599 | 0.96 | 2.0 | 1.3891 |
| 2 | M'D$_{25}$M' | 64.8 | — | — | 895 | 0.96 | 23 | 1.4003 |
| 3 | M'D$_{500}$M' | 3.4 | — | — | 956 | 0.96 | — | 1.4029 |
| 4 | MD$_{100}$D$_2$'M | — | 15 | 48.0 | 897 | 1.0 | 128 | 1.4021 |
| 5 | MD$_{500}$D$_2$'M | — | 3.1 | 10.0 | 947 | 1.0 | 2860 | 1.4029 |

Staple Pad Friction Index

This test was utilized to determine the lubricity of the compounds of the present invention applied to polyester fiberfill. The staple pad friction was determined by pulling a 4,540 gram sled across 1.0 gram fiberfill specimen resting on an emergy paper covered table, at 1 inch per minute. The frictional force generated was measured by an Instrom testing apparatus.

The staple pad friction was converted to a staple pad friction (SPF) index according to the following relationship:

$$SPF\ Index = \frac{Sliding\ Force\ (grams)}{Sled\ Weight\ (grams)}$$

Softness

Softness imparted to a fabric was determined by a testing panel of three persons who were given specimens of a control (i.e. untreated fabric) and specimens of fabric treated with the compounds of the present invention for evaluation. The final evaluation, i.e., whether the specimens treated with the finishing agent were softer than the control, reported the average of the devaluation of the three panelists.

EXAMPLES 1-5

These Examples illustrate the preparation of silanic hydrogen functional silicone precursors.

The procedure generally followed included adding the reactants to a nitrogen purged 250 ml, three necked round bottom flask fitted with a mechanical agitator and a nitrogen bi-pass on the vent. This mixture was agitated for some four to six hours at 25° C. to fully equilibrate. The mixture was neutralized by slurrying overnight with 1.2 g NaHCO$_3$. The product was refined via pressure filtration through a 0.02 micron pad.

EXAMPLES 6-14

These Examples illustrate the preparation of functional silicone oils of the present invention.

The general procedure utilized was generally as follows. The reactants were added to a 0.1 ft$^3$ N$_2$/hr purged 250 cc three necked round bottom flask fitted with a mechanical agitator, a dropping funnel, an adapter equipped with a thermometer and a Friedrich's condenser. The solution was heated, and the hydrosilylation reaction was initiated by the addition of 25 ppm Pt as H$_2$PtCl$_6$ in dimethoxyethane. The system immediately exothermed, and was cooled and maintained for 1 hour at 90° C. The crude reaction product was slurried for 1 hour at 90° C. with 1.0 g NaHCO$_3$ to neutralize all acidity. Excess olefin generally was removed via reduced pressure distillation at 65°–75° C. at less than 1.0 mm Hg. The stripped reaction product was refined by pressure filtration through a pad to give a crystal clear fluid. The compounds were characterized by viscosity, refractive index, infrared spectroscopy and gel permeation chromatography. The characterizations confirmed the presence of the expected compounds. Table II sets forth the specific details of certain of the parameters and the characterizations:

TABLE II

| | | Reactants | | | | Properties | |
|---|---|---|---|---|---|---|---|
| | | Precursor | | Vinylsilane Compound | | Vis, cps | Refractive Index |
| Ex. No. | Formula | Type | Amount (g) | Type | Amount (g) | at 25° C. | $n_D^{25}$ |
| 6 | "MM" | M'M' | 125.2 | ViSi(OMe)$_3$ | 343.5 | 7 | 1.4151 |
| 7 | "MD$_3$M" | Ex. 1 | 246.5 | ViSi(OMe)$_3$ | 254.4 | 8 | 1.4109 |
| 8 | "MD$_{25}$M" | Ex. 2 | 348.4 | ViSi(OMe)$_3$ | 64.5 | 30 | 1.4044 |
| 9 | "'MD$_{25}$M'" | Ex. 2 | 336.0 | ViSi(OEt)$_3$ | 80.0 | 37.5 | 1.4053 |
| 10 | "MD$_{500}$M" | Ex. 3 | 446.5 | ViSi(OMe)$_3$ | 4.4 | 10,000 | 1.4027 |
| 11 | "MD$_{100}$D$_2$"M | Ex. 4 | 385.3 | ViSi(OMe)$_3$ | 18.4 | 105 | 1.4035 |
| 12 | "MD$_{500}$D$_2$"M | Ex. 5 | 396.9 | ViSi(OMe)$_3$ | 3.9 | 3200 | 1.4028 |
| 13 | "'MD$_{100}$D$_2$'''M | Ex. 4 | 371.7 | ViSi(OEt)$_3$ | 22.85 | 122.5 | 1.4035 |
| 14 | "MD$_{100}$D$_2$''''M | Ex. 4 | 483.8 | ViSiMe$_2$OEt | 20.3 | 133 | 1.4041 |

EXAMPLE 15

The alkoxysilylalkyl silicones of the present invention were evaluated for lubricity and durability as finishing agents for fiberfill.

Treating solutions containing the desired alkoxysilylalkyl functional silicone were prepared by stirring 20.0 grams of the functional silicone slowly into a mixture of 2.0 grams of a 1/1 by weight mixture of Brij 30/Brij 35 nonionic surfactants (lauryl alcohol ethoxylates) and 1.0 gram water in a plastic beaker. After mixing well, 67.0 grams of water were added to the mixture slowly until the desired emulsion was prepared. This emulsion (20% active) was then diluted to 1% active with water. One percent glacial acetic acid was then added.

Fiberfill samples treated with the emulsions described above were prepared by manually padding, i.e., squeezing by hand, the treating solution onto approximately 10.0 grams of Hollofil 808 polyester fiberfill. The wet Hollofil 808 as allowed to air dry for 16 hours and was then dried in a forced air oven at 165° C. for 10 minutes. The samples were then conditioned for 24 hours at 50 percent relative humidity and 70° F. The staple pad friction index for the treated, but unwashed fiberfill, was then determined.

Thereafter, approximately 5.0 grams of the treated fiberfill was washed with 1 liter of a 1.5 percent by weight detergent (AATCC #124) at 65° C. for 10 minutes. The extracted specimen was then rinsed with distilled water and allowed to air dry for 16 hours, then dried at 165° C. for 10 minutes. The dried specimens were conditioned for 24 hours at 50 percent relative humidity and 70° F. The SPF index was determined on the treated and washed fiberfill.

The results of these tests are set forth in Tables III through VI. In each of the Tables, the term wt. % denotes the wt. % of the silicone in the treating solution.

Table III reports the test results of the control and using the functionally terminated specie:

TABLE III

| Silicone | wt. % | Staple Pad Friction Index | |
|---|---|---|---|
| | | Before Wash | After Wash |
| Untreated Control | — | 0.359 | 0.348 |
| M"$D_3$M" | 1.0 | 0.311 | 0.272 |
| M"$D_6$M" | 1.0 | 0.195 | 0.192 |
| M"$D_{12}$M" | 1.0 | 0.171 | 0.162 |
| M"$D_{25}$M" | 1.0 | 0.168 | 0.163 |
| M"$D_{50}$M" | 1.0 | 0.176 | 0.169 |
| M"$D_{100}$M" | 1.0 | 0.183 | 0.169 |
| M"$D_{200}$M" | 1.0 | 0.185 | 0.160 |

Table IV reports the test results also using functionally terminated specie and untreated control, the test being carried out with new emery paper as compared with that used for the tests set forth in Table III:

TABLE IV

| Silicone | wt. % | Staple Pad Friction Index | |
|---|---|---|---|
| | | Before Wash | After Wash |
| Untreated Control | — | 0.454 | 0.401 |
| M"M" | 1.0 | 0.394 | 0.361 |
| M"$D_{25}$M" | 1.0 | 0.266 | 0.245 |
| M"$D_{25}$M" | 0.50 | 0.219 | 0.176 |
| M"$D_{25}$M" | 0.25 | 0.181 | 0.175 |
| M"$D_{500}$M" | 1.0 | 0.271 | 0.265 |

Table V reports the test results for a control and certain specie of the pendant group type, the old emery having been employed:

TABLE V

| Silicone | wt. % | Staple Pad Friction Index | |
|---|---|---|---|
| | | Before Wash | After Wash |
| Untreated Control | — | 0.359 | 0.348 |
| M$D_6D_2''$M | 1.0 | 0.277 | 0.256 |
| M$D_{25}D_2''$M | 1.0 | 0.232 | 0.217 |
| M$D_{50}D_2''$M | 1.0 | 0.208 | 0.174 |
| M$D_{100}D_2''$M | 1.0 | 0.170 | 0.171 |
| M$D_{500}D_2''$M | 1.0 | 0.221 | 0.207 |

TABLE V-continued

| Silicone | wt. % | Staple Pad Friction Index | |
|---|---|---|---|
| | | Before Wash | After Wash |
| M$D_{300}D_5''$M | 1.0 | 0.229 | 0.207 |
| M$D_{300}D_{30}''$M | 1.0 | 0.255 | 0.211 |

Table VI reports the test results for a control and certain specie of the pendant group type, the new emery paper having been used:

TABLE VI

| Silicone | wt. % | Staple Pad Friction Index | |
|---|---|---|---|
| | | Before Wash | After Wash |
| Untreated Control | 1.0 | 0.454 | 0.401 |
| M$D_{100}D_2'''$M | 1.0 | 0.296 | 0.270 |

The data above illustrate both the improved lubricity and the durability imparted through utilization of the compounds of the present invention. Both terminal and pendant alkoxysilylalkyl functional silicones impart substantial lubricity properties to polyester fiberfill, and a broad range of the pendant silicones provide exellent lubricity properties. Moreover, low concentrations of alkoxysilylalkyl silicones, and especially trimethoxysilylethyl functional silicones (as low as 0.25% by weight of treating solution) provide excellent fiberfill lubricity. The durability of the compounds of the present invention is likewise readily apparent from the data which shows that the SPF Index stayed the same or even decreased after washing. A lack of durability would have been reflected by an increase in the SPF Index.

EXAMPLE 16

This Example illustrates the use of alkoxysilylalkyl functional silicones as fabric softeners.

Two approximately 12×15 inch 100% cotton (Testfabrics, Type 400M) specimens were dipped into finishing solutions containing the amount and type of functional silicone set forth in the table. The testing solution consisted of a 14.0% glyoxal based resin (DMDHEU), 1.4% zinc borofluorate, 1.0% silicone (actives) and 83.6% water. The treating solution was padded on to the specimen using a AHIBA Mathis Vertical Padder, type VF at 2.0 bars and 6 centers/minute to give an 80% wet pick-up.

The treated fabric was then stretched on a pinframe and dried at 165° C. for two minutes. The fabric specimens were then conditioned at 60% relative humidity and 70° C. for 24 hours. The relative softness is set forth. The entry "O" indicates that the relative softness was considered the same as the control, while the entry "+" indicates that the treated specimen as considered to be softer than the control.

One of the fabric specimens was then washed five times successively in a Sears Kenmore Model 29601 washer at 100° F. with 90.0 grams of standard AATCC detergent #124/wash cycle. The total wash cycle was about 30 minutes. After washing, the test specimens were conditioned again at 50% relative humidity and 70° C. for 24 hours. The relative softness of the fabric specimen with respect to a control was thereafter evaluated by the panel.

TABLE VII

| Silicone | wt. % | Relative Softness Before Wash | Relative Softness After Wash |
|---|---|---|---|
| Control permanent press resin treated only | — | 0 | 0 |
| M"D$_6$M" | 1.0 | + | 0 |
| M"D$_{25}$M" | 1.0 | + | 0 |
| M"D$_{100}$M" | 1.0 | + | + |
| M"D$_{200}$M" | 1.0 | + | + |
| MD$_6$D$_2$"M | 1.0 | + | 0 |
| MD$_{25}$D$_2$"M | 1.0 | + | 0 |
| MD$_{100}$D$_2$"M | 1.0 | + | 0 |

All of the functional silicone compounds of the present invention imparted excellent softness to the fabric and the larger siloxane chain functional silicones, i.e. M"D$_{100}$M" and M"D$_{200}$M" were especially effective.

We claim:

1. An alkoxysilyl functional silicone represented by a formula $$(R_1)_3SiO[(R_2)_2SiO]_y[R_2SiO]_zSi(R_1)_3$$
$$|$$
$$(CH_2)_wSi(OR)_{3-x}$$
$$|$$
$$(R_1)_x$$

wherein R is an alkyl or an acyl hydrocarbon radical having from one to four carbon atoms; $R_1$ is an alkyl radical of from one to two carbon atoms or a mixture thereof; $R_2$ is an alkyl radical having from one to three carbon atoms, mixtures thereof, or an aryl radical selected from the group consisting of phenyl, benzyl and phenylethyl, mixtures thereof, or a mixture of said alkyl and aryl radicals; w is an integer of from 2 to about 20; x is an integer of from 0 to 2; y is an integer of an average of at least 6 and z is an integer of an average of at least 1.

2. The alkoxysilyl functional silicone as defined in claim 1 wherein R is a methyl radical.

3. The alkoxysilyl functional silicone as defined in claim 2 wherein each of $R_1$ and $R_2$ is a methyl radical.

4. The alkoxysilyl functional silicone as defined in claim 1 wherein x is an integer of either 0 or 1.

5. The alkoxysilyl functional silicone as defined in claim 1 wherein w is an integer of either 2 or 3.

6. The alkoxysilyl functional silicone as defined in claim 1 wherein y is an integer of an average of from about 6 to about 1000.

7. The alkoxysilyl functional silicone as defined in claim 1 wherein z is an integer of an average of from about 1 to about 100.

8. An alkoxysilyl functional silicone repesented by a formula $$(CH_3)_3SiO[(CH_3)_2SiO]_y[CH_3SiO]_zSi(CH_3)_3$$
$$|$$
$$(CH_2)_2Si(OR)_{3-x}$$
$$|$$
$$(CH_3)_x$$

wherein R is methyl, ethyl or acetyl; x is an integer of from 0 to 2; y is an integer of an average of at least about 6 and z is an integer of an average of at least about 1.

9. The alkoxysilyl functional silicone as defined in claim 8 wherein R is methyl and x is zero.

* * * * *

UNITED STATES PATENT AND TRADEMARK OFFICE
CERTIFICATE OF CORRECTION

PATENT NO. : 4,579,964             Page 1 of 3

DATED : April 1, 1986

INVENTOR(S) : George E. Totten et al.

It is certified that error appears in the above-identified patent and that said Letters Patent is hereby corrected as shown below:

Add Claims 10 and 11 as per attached:

On the title page "9 Claims" should read -- 11 Claims --.

Signed and Sealed this

Fifteenth Day of July 1986

[SEAL]

Attest:

DONALD J. QUIGG

Attesting Officer      Commissioner of Patents and Trademarks

UNITED STATES PATENT AND TRADEMARK OFFICE
CERTIFICATE OF CORRECTION

PATENT NO. : 4,579,964

DATED : April 1, 1986

INVENTOR(S) : George E. Totten et al.

It is certified that error appears in the above-identified patent and that said Letters Patent is hereby corrected as shown below:

--10. An alkoxysilyl functional silicone represented by the general formula:

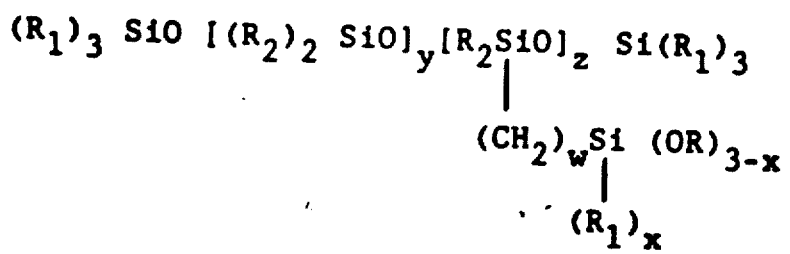

R is an alkyl of from 1 to 4 carbon atoms $R_1$ is an alkyl of 1 to 2 carbon atoms $R_2$ is a methyl y is an integer of at least six z is an integer of one w is an integer of from 2 to about 20 x is an integer of zero or one. --

UNITED STATES PATENT AND TRADEMARK OFFICE
CERTIFICATE OF CORRECTION

PATENT NO. : 4,579,964

DATED : April 1, 1986

INVENTOR(S) : George E. Totten et al.

It is certified that error appears in the above-identified patent and that said Letters Patent is hereby corrected as shown below:

-- 11 . An alkoxysilyl functional silicone represented by the general formula:

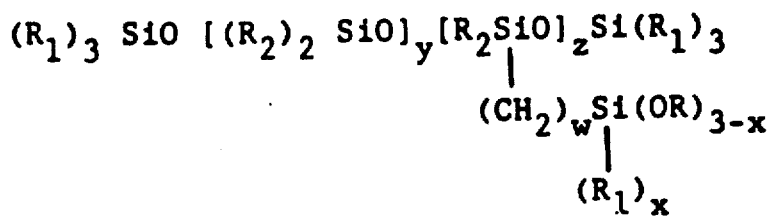

R is an alkyl of from 1 to 4 carbon atoms $R_1$ is an alkyl of 1 to 2 carbon atoms $R_2$ is a methyl y is an integer of at least six z is an integer of two w is an integer of from 2 to about 20 x is an integer of zero or one. --